United States Patent [19]

Dehennau et al.

[11] Patent Number: 4,690,628
[45] Date of Patent: Sep. 1, 1987

[54] ADJUSTABLE FEED BLOCK FOR COEXTRUSION DIE

[75] Inventors: Claude Dehennau, Waterloo; Paul Dubois, Ghislenghien, both of Belgium

[73] Assignee: Solvay & Cie. (Societe Anonyme), Brussels, Belgium

[21] Appl. No.: 785,591

[22] Filed: Oct. 8, 1985

[30] Foreign Application Priority Data

Oct. 18, 1984 [FR] France .............................. 84 16100

[51] Int. Cl.$^4$ .............................................. B29C 47/06
[52] U.S. Cl. ................................. 425/133.5; 264/171; 425/381; 425/466
[58] Field of Search ...................... 425/113, 114, 131.1, 425/376 A, 133.5, 190, 376 R, 461, 465, 466, 141, 145; 264/177 R, 173, 171, 75, 177.1

[56] References Cited

U.S. PATENT DOCUMENTS

| | | | |
|---|---|---|---|
| 255,309 | 3/1882 | Maxim | 264/167 |
| 3,743,460 | 7/1973 | Woolridge | 425/133.5 |
| 3,829,274 | 8/1974 | Melead | 425/466 |
| 3,865,665 | 2/1975 | Marion | 425/133.5 |
| 3,877,857 | 4/1975 | Melead | 425/466 |
| 4,165,210 | 8/1979 | Corbett | 425/462 |
| 4,289,560 | 9/1981 | Simons | 264/177 R |
| 4,383,812 | 5/1983 | Calcagni | 264/173 |
| 4,531,326 | 7/1985 | Ballocca et al. | 425/466 |
| 4,533,510 | 8/1985 | Nissel | 425/462 |
| 4,576,773 | 3/1986 | Azzola et al. | 264/177 R |

FOREIGN PATENT DOCUMENTS

| | | | |
|---|---|---|---|
| 1444561 | 8/1976 | United Kingdom. | |
| 1495879 | 12/1977 | United Kingdom | 425/466 |

Primary Examiner—Jay H. Woo
Assistant Examiner—J. Fortenberry
Attorney, Agent, or Firm—Spencer & Frank

[57] ABSTRACT

An adjustable feed block for a coextrusion die is provided. The feed block comprises a main central channel for conveying a main stream of molten thermoplastic material towards a coextrusion die, and at least one secondary channel, substantially parallel to the central channel, for conveying a second molten thermoplastic intended to form a local coating layer on the main stream. The downstream end of each secondary channel is inclined relative to the central channel and connected to a portion of the periphery of the said channel. The connection between the central channel and each secondary channel is laterally delimited by the ends of two adjustable slides which can be moved at right angles to the axis of the central channel. These slides make it possible to adjust, during operation, the position and width of the streams of thermoplastic deposited on the main stream. Preferably, each secondary channel is subdivided into two curved branches which join together again upstream of the connection to the central channel, in such a way as to form an angle substantially equal to 180° between them. Each secondary channel can be equipped with an adjustable distributor. The novel feed block is particularly suitable for coextrusion of profiles such as profiles for door frames or window frames.

6 Claims, 2 Drawing Figures

ADJUSTABLE FEED BLOCK FOR COEXTRUSION DIE

BACKGROUND OF THE INVENTION

1. Field of the Invention

The present invention relates to an adjustable feed block for a coextrusion die, which block is particularly suitable for the continuous production of articles such as thermoplastic profiles which locally possess at least one coating layer such as, for example, a protective layer or a decorative layer.

2. Description of the Background

In the production of extruded articles such as profiles used especially for the production of door frames or window frames, it is desirable to have available profiles which locally possess a surface coating layer providing protection and/or decoration of the profiles. Thus, for example, it is desirable that the face of the profile which subsequently will be required to be exposed to sunlight should be effectively protected by a coating layer containing anti-ultraviolet agents, as is proposed in particular in French Pat. No. 1,571,391. Moreover, it can also be desirable to have available two-coloured profiles which exhibit a particular decorative effect and to achieve this by applying to the surface one or more local coating layers having a different colour from the thermoplastic of which the profile consists.

In order to be able to produce such products it has already been proposed, in Belgian Patent A-805,066, to use an extrusion head equipped with a suitable die, in which the outlet zone of the die is locally equipped with a channel through which the coating layer is delivered, and an adjustment sheet or plate which permits controlling the thickness of the coating layer locally deposited on the extruded profile.

In the device according to the said patent, it is however necessary, for a given profile produced, to change the die and reset the device if, during production, it is desired to alter the location and/or width of the coating layer, and hence it is necessary to clean the die. Moreover, changing to a different type of profile also involves a rather lengthy operation of changing the die and the adjustment. Furthermore, the presence of a thickness-adjusting plate or sheet creates the danger of producing stagnation of molten thermoplastic and hence the danger of thermal degradation of this thermoplastic, especially if it is heat-sensitive. Finally, the equipment required with the device according to the said patent is expensive because it requires having available a series of very elaborate and hence very costly dies.

SUMMARY OF THE INVENTION

The present invention overcomes these disadvantages and provides an adjustable feed block for a coextrusion die, which block makes it possible to adjust continuously the location and width of a coating layer, during operation, without any change to the die, and to do so in a manner which minimises the danger of thermal degradation of the thermoplastic which is fed through.

DESCRIPTION OF THE INVENTION

The present invention provides an adjustable feed block for a coextrusion die, comprising a main central channel for conveying a main stream of molten thermoplastic towards a coextrusion die and at least one secondary channel, substantially parallel to the central channel, for conveying a second molten thermoplastic intended to form a local coating layer on the main stream, the downstream end of each secondary channel being inclined relative to the central channel and connected to a portion of the periphery of the said channel, the said feed block being characterised in that the connection between the main channel and each secondary channel is laterally delimited by the ends of two adjustable slides which can be moved at right angles to a plane containing the axis of the central channel.

In the feed block according to the present invention, the stream or streams of molten thermoplastic conveyed by the secondary channel or channels is or are accordingly applied to the main stream of molten thermoplastic over a width, and according to a positioning, which depend on the adjustment of the movable slides located in the connection zone. This positioning of the movable slides can be effected during the operation of the device, in accordance with the profile of the coextrusion die mounted downstream of the feed block and in accordance with the part of the extruded profile on which it is desired to apply the coextruded coating layer. Thus, in the production of profiles for window frames which are symmetrical, the mobile slides can be so adjusted that the streams of thermoplastic fed through the secondary channels are deposited on the main stream of thermoplastic symmetrically relative to the vertical plane of symmetry of the flow channel of this main stream, while in the production of profiles for asymmetrical window frames, the slides can be so adjusted that the streams of thermoplastic fed through the secondary channels are deposited on the main stream of thermoplastic asymmetrically relative to the vertical plane of symmetry of the main flow channel, it being possible to alter the positioning of the slides at any instance during production so as to correct any failure of proper positioning of the coating layer or layers which may manifest itself on the coextruded product.

According to an embodiment which has proved advantageous, the axis of the central channel and the axes of the downstream ends of each secondary channel form an angle of from 30° to 60° between them, so as to ensure that the streams of thermoplastic fed through these channels are brought into contact gradually.

According to another embodiment, the central channel, which is of substantially circular cross-section, is flattened in the zone where each secondary channel connects with the central channel, so as to avoid any infiltration of molten thermoplastic at rightangles to the slides and so as to facilitate the application of the coating layers.

According to a different embodiment of the feed block according to the invention, which has proved particularly advantageous where the thermoplastics employed to form the coating layer or layers are particularly heat-sensitive, each secondary channel is subdivided into two curved branches which join together again upstream of the connection to the central channel, the ends of each branch preferably joining together again so as to form an angle substantially equal to 180° between them. In this manner, the streams of molten thermoplastic intended to form the coating layers are brought to the connection zone in a direction which is substantially parallel to the direction of movement of the slides, thus avoiding any stagnation of molten thermoplastic at these slides.

Finally, according to a last embodiment which can advantageously be exploited where the secondary channel or channels is or are subdivided into two branches, each secondary channel can, at its branching zone, be equipped with an adjustable distributor which permits controlling the amount of molten thermoplastic fed into each of the two branches. The distributor can be so designed that it forms a portion of the walls of the two curved branches. Thus, it is permissible to adjust the distributor either so as to balance streams of molten thermoplastic in the two branches if the corresponding slides are adjusted symmetrically relative to the axis of the central channel, for example in the production of symmetrical profiles, or to unbalance the streams of molten thermoplastic in the two branches if the corresponding slides are adjusted asymmetrically relative to the axis of the central channel, for example in the production of asymmetrical profiles. With the feed block according to this embodiment, it is thus possible to alter both the adjustment of the slides and the adjustment of the distributor in accordance with the type of profile desired and in particular to control the width and positioning of the streams of molten thermoplastic fed through the secondary channels in accordance with the desired covering on the coextruded product.

The feed block according to the invention is particularly suitable for feeding a coextrusion die for profiles suitable for the production of door frames or window frames but it can of course also be suitable for the production of other types of profiles such as cladding panels, etc. and even for the production of flat or corrugated panels.

The adjustable feed block according to the present invention is furthermore explained in greater detail in the practical embodiment which will now be described and for the description of which reference will be made to the Figures in the attached drawings.

Figure 1:
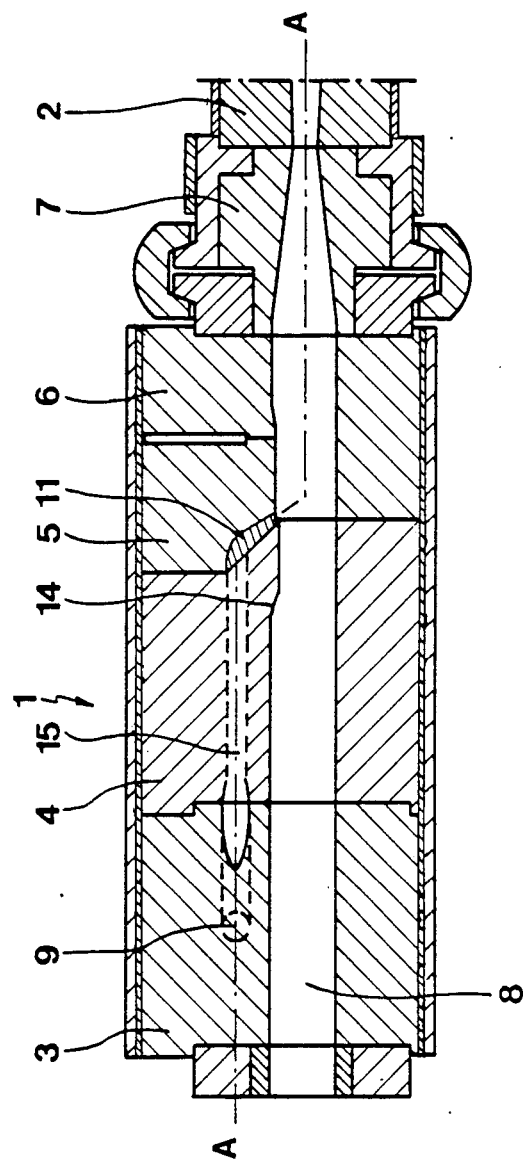
FIG. 1 is a cross-sectional view and elevation view of an adjustable feed block according to the invention and FIG. 2 is a plan view and cross-sectional view along axis AA of FIG. 1.
Figure 2:
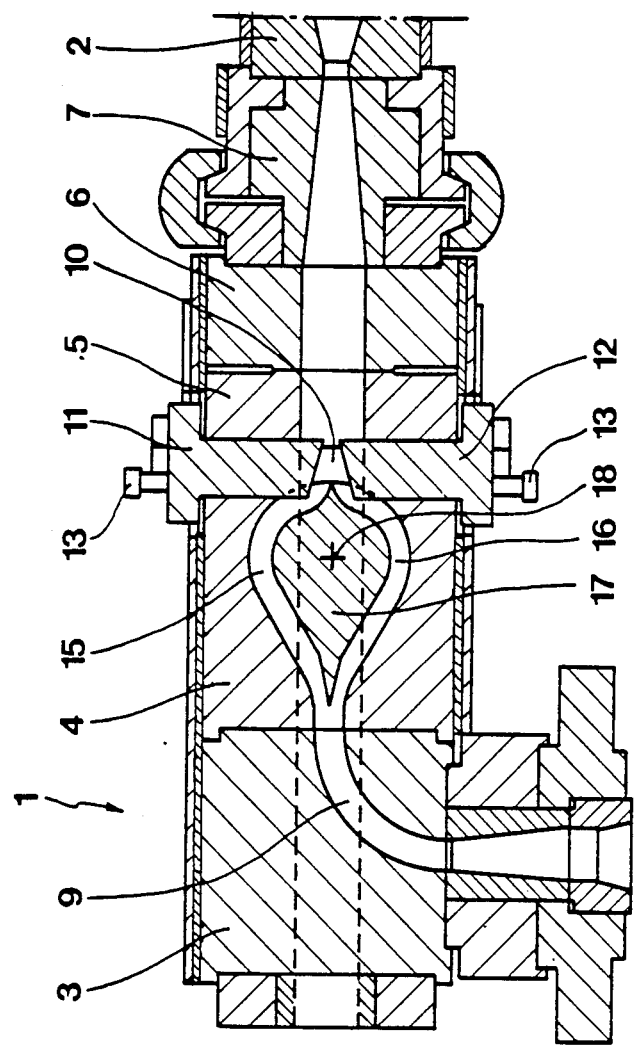

As may be seen in FIGS. 1 and 2, the adjustable feed block 1 intended to be connected to a (partially shown) coextrusion die 2 comprises the elements 3, 4, 5, 6 and 7 which delimit a main central channel 8 which can convey a main stream of molten thermoplastic to the die 2, this stream being fed from an extruder which is not shown. Furthermore, in the feed block illustrated, the elements 3, 4, 5 and 6 also delimit a secondary channel 9 connected by an elbow to a second extruder (not shown) which delivers a second stream of molten thermoplastic intended to form a coating layer on the main stream of molten thermoplastic. The secondary channel 9 is substantially parallel to the central channel 8 and its downstream end 10 is inclined relative to the central channel 8 and connected to a portion of the periphery of this central channel 8. The inclination between the central channel 8 and the end of the channel 9 is of the order of 45°. According to the invention, the connection between the central channel 8 and the secondary channel 9 is laterally delimited by two adjustable slides 11 and 12 equipped with adjustment means 13, which allows their spacing relative to the vertical plane of symmetry of the central channel 8 to be controlled. The two slides 11 and 12 can move independently in a direction at rightangles to the axis of the central channel 8 and thus can delimit the position and width of the stream of thermoplastic fed through the channel 9 onto the main stream of thermoplastic fed through the central channel 8. In the position shown, the two slides 11 and 12 are spaced symmetrically relative to the vertical plane of symmetry of the central channel 8 and the feed block is adjusted for the extrusion of a symmetrical profile covered with a coating layer of predeterminable width.

The central channel 8 is of circular cross-section but the element 4 exhibits a projection 14 which locally flattens the cross-section of the central channel 8 in the zone of connection with the secondary channel 9 in order, on the one hand, to facilitate the application of the coating layer onto the main stream of molten thermoplastic and, on the other hand, to avoid infiltration of molten thermoplastic at rightangles to the slides 11 and 12.

As can be seen more particularly in FIG. 2, the secondary channel 9 is subdivided into two curved branches 15, 16 by means of a distributor 17 which can pivot in a controllable manner about the axis 18. The distributor 17 is broadly heart-shaped and forms a portion of the walls of the two curved branches. The curved branches 15 and 16 are so profiled that their ends join up again so as to form an angle of 180° between them. In this way, the stream of molten thermoplastic delivered by the branches 15 and 16 is led in a direction substantially parallel to the direction of movement of the slides 11 and 12, thereby making it possible to minimise any danger of stagnation, and hence of degradation, of the molten thermoplastic delivered through the branches 15 and 16.

In FIG. 2, the distributor 17 is shown in a position such that the streams of molten thermoplastic delivered by each branch 15 and 16 are balanced, which is generally the case if the feed block is connected to a die 2 which forms a symmetrical profile, of which one face requires to be entirely covered with a layer of thermoplastic coating. Where it is desired only to cover a part of one of the faces of the profile with a coating layer positioned in a predetermined manner, this can be done by suitably moving the slides 11 and 12 and if appropriate pivoting the distributor 17 in a controlled manner so as to unbalance the streams of molten thermoplastic delivered by the branches 15 and 16.

By acting on these elements 11, 12 and 17 it is thus possible to adjust the feed block in such a manner that the extruded profile exhibits a coating layer in the desired position and of the desired width.

If the feed block is connected to a die 2 which forms an asymmetrical profile, it is also possible to adjust the coating layer in a very precise manner by acting on the same elements 11, 12 and 17.

We claim:

1. Adjustable feed block for a coextrusion die, comprising a main central channel having an axis for conveying a main stream of molten thermoplastic in a downstream direction towards a coextrusion die and at least one secondary channel, having a portion which is substantially parallel to the central channel, for conveying a second stream of molten thermoplastic in the downstream direction to form a local coating layer on the main stream, each secondary channel having a downstream end which is inclined relative to the central channel and which is connected to a portion of the periphery of the said central channel, wherein a connection between the central channel and each secondary channel is laterally delimited by ends of two adjustable slides which can be moved in a direction at right angles to a plane containing the axis of the central channel, and wherein each secondary channel is subdivided into two curved branches which join together again before the respective second stream of molten thermoplastic reaches the connection to the central channel.

2. Feed block according to claim 1, wherein the downstream end of each secondary channel has a respective axis, and wherein the axis of the central channel and the axis of the downstream end of each secondary channel form an angle of from 30° to 60° between them.

3. Feed block according to claim 1, wherein the central channel is of substantially circular cross-section, and is flattened in a zone upstream of the portion of the central channel connected to each secondary channel.

4. Feed block according to claim 1, wherein each branch leads said second stream of molten thermoplastic in a direction substantially parallel to the direction of movement of the two slides.

5. Feed block according to claim 1, wherein each secondary channel is equipped, at its branching zone, with an adjustable distributor which permits control of the amount of molten thermoplastic fed into each of the two branches.

6. Feed block according to claim 1, wherein the feed block is equipped with a die for the production of profiles or of panels selected from the group consisting of flat and corrugated panels.

* * * * *